United States Patent
Brackman

[11] 3,731,345
[45] May 8, 1973

[54] CHARGING APPARATUS

[75] Inventor: Donald Alvin Brackman, Englewood, Ohio

[73] Assignee: The Hobart Manufacturing Company, Troy, Ohio

[22] Filed: Oct. 12, 1971

[21] Appl. No.: 188,146

[52] U.S. Cl..................................17/32, 425/251
[51] Int. Cl.................................................A22c 7/00
[58] Field of Search ...................17/32; 425/251, 252

[56] References Cited

UNITED STATES PATENTS

| | | | |
|---|---|---|---|
| 3,550,189 | 12/1970 | Lotz | 17/32 |
| 3,526,923 | 9/1970 | Barnes | 17/32 |
| 3,457,587 | 7/1969 | Holly | 17/32 |

Primary Examiner—Louis G. Mancene
Assistant Examiner—D. L. Weinhold
Attorney—Lawrence B. Biebel et al.

[57] ABSTRACT

Apparatus for charging the cavity in the mold plate of a patty machine with a food product, such as a meat product to form hamburger patties. The charging apparatus includes a cylinder having a first opening for receiving the food product and a second opening, peripherally displaced from the first opening, through which the product is discharged from the cylinder into the mold plate cavity. A piston is rotatably mounted in the cylinder and conveys the food product from the first opening to the second as the piston rotates about the longitudinal axis of the cylinder.

12 Claims, 14 Drawing Figures

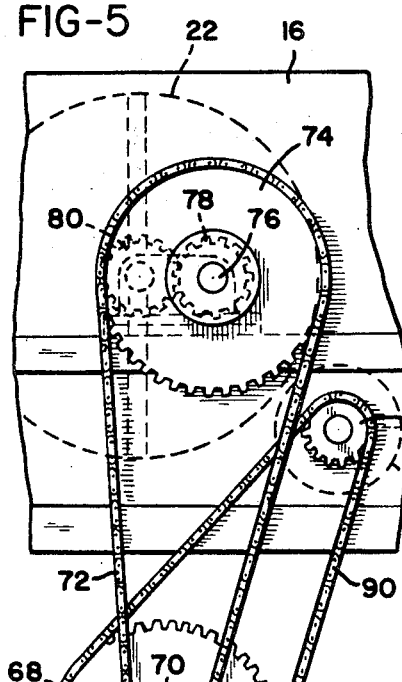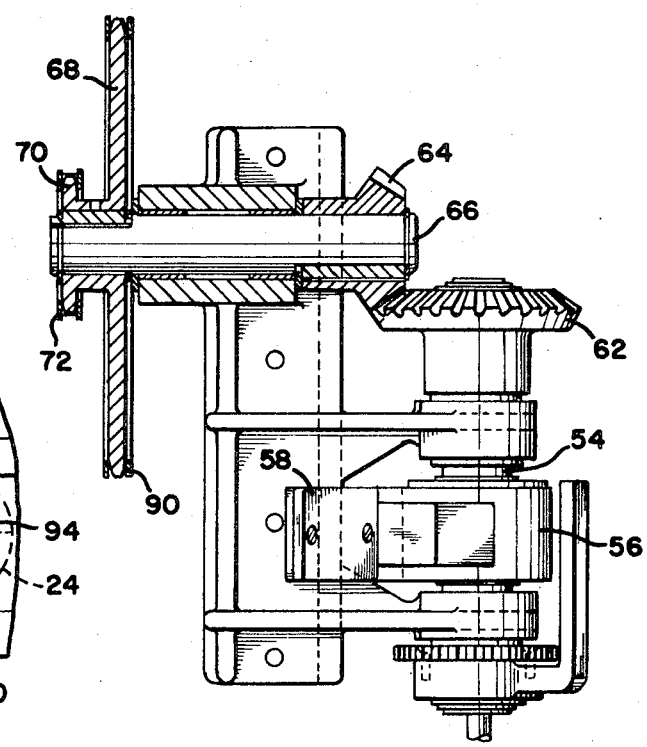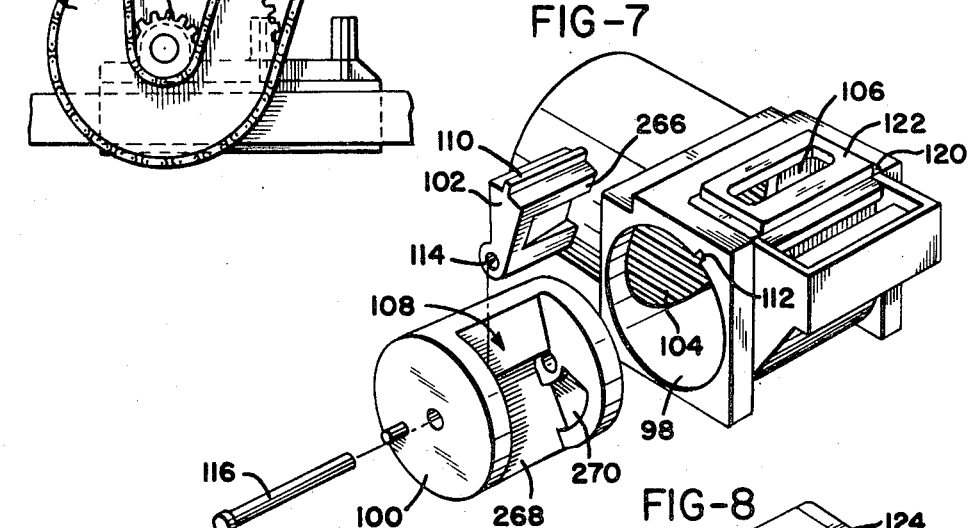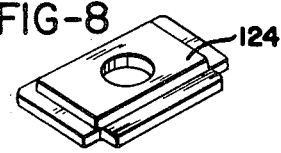

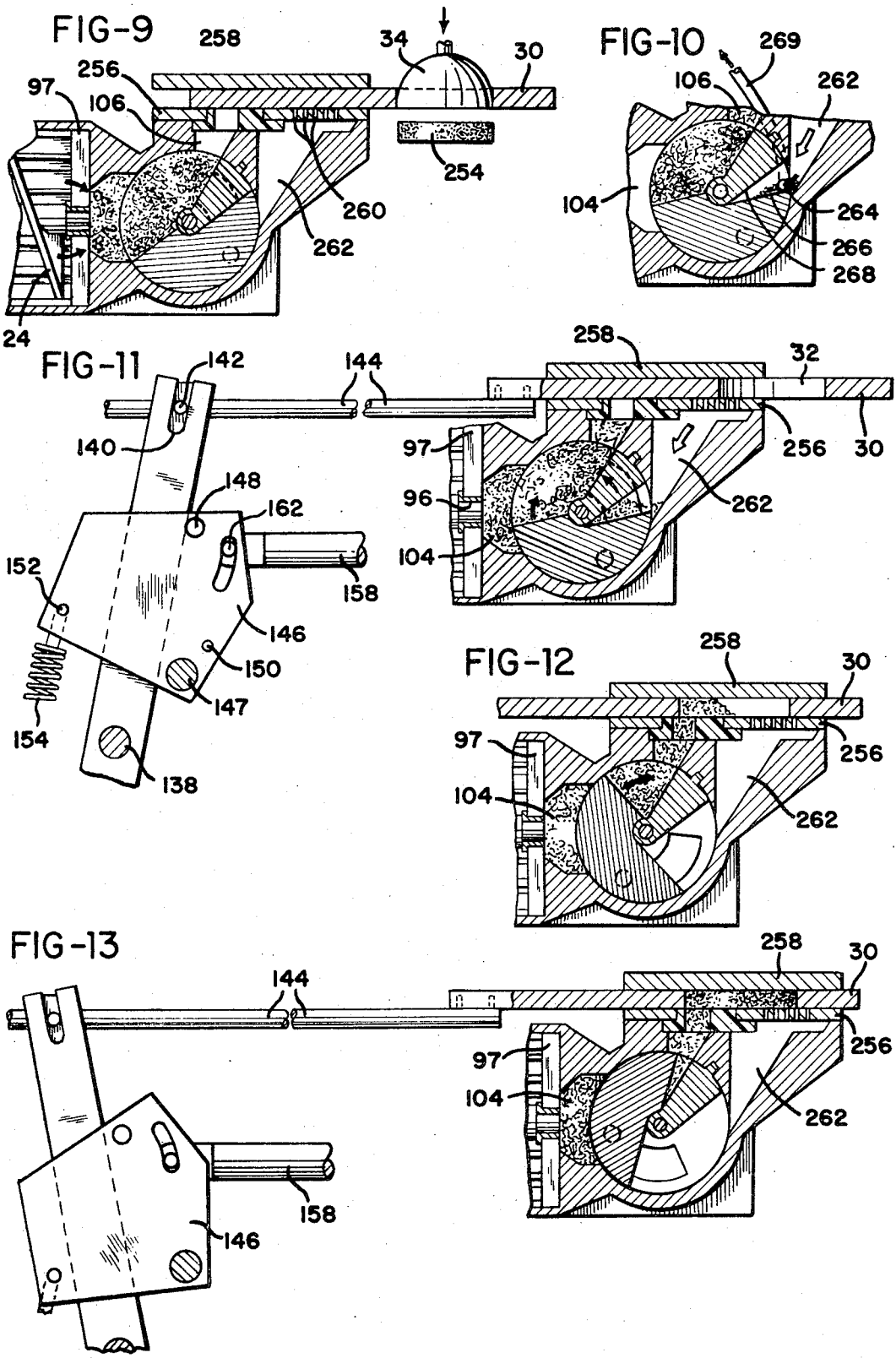

CHARGING APPARATUS

CROSS REFERENCE TO RELATED APPLICATIONS

PATTY MACHINE, Ser. No. 188,145 filed Oct. 12, 1971.

BACKGROUND OF THE INVENTION

Commercial installations, such as restaurants, cafeterias, etc., often require large volumes of molded meat products, such as hamburger and sausage patties. Quite often the patties are prepared to their specification by a provision firm which prepares such patties in advance and freezes them in boxes in some predetermined number and/or weight. Since production runs of these patties will often amount to several thousand pounds of such product it is apparent that means must be provided for producing the product on a high volume basis and with a high degree of control over the uniformity of the patties.

SUMMARY OF THE INVENTION

Mold charging apparatus which receives a charge of a food product from a hopper and ejects it through a discharge opening under pressure into a mold cavity in a mold plate.

The charging apparatus permits accurately metered charges of the product to be discharged into the cavity at relatively high rates of speed to thereby provide accurate, high speed operation.

Additionally, the mold plate itself is changeable to permit mold plates having cavities therein of various sizes and shapes to be used. A socket in the discharging opening of the mold charging piston and cylinder mounts a nozzle for controlling the flow of the product into the mold cavity and the nozzles may also be changed according to the desired patty size and shape.

BRIEF DESCRIPTION OF THE DRAWINGS

FIG. 5 is a view taken on the line 5—5 of FIG. 1;

FIG. 6 is a view taken on line 6—6 of FIG. 1;

FIG. 7 is an exploded perspective view of the piston and cylinder charging device;

FIG. 8 is a view of a nozzle interchangeable with the nozzle shown in FIG. 7;

FIGS. 9 through 13 are views showing the formation of patties in the apparatus of the present invention.

DESCRIPTION OF THE PREFERRED EMBODIMENTS

Figure 1:
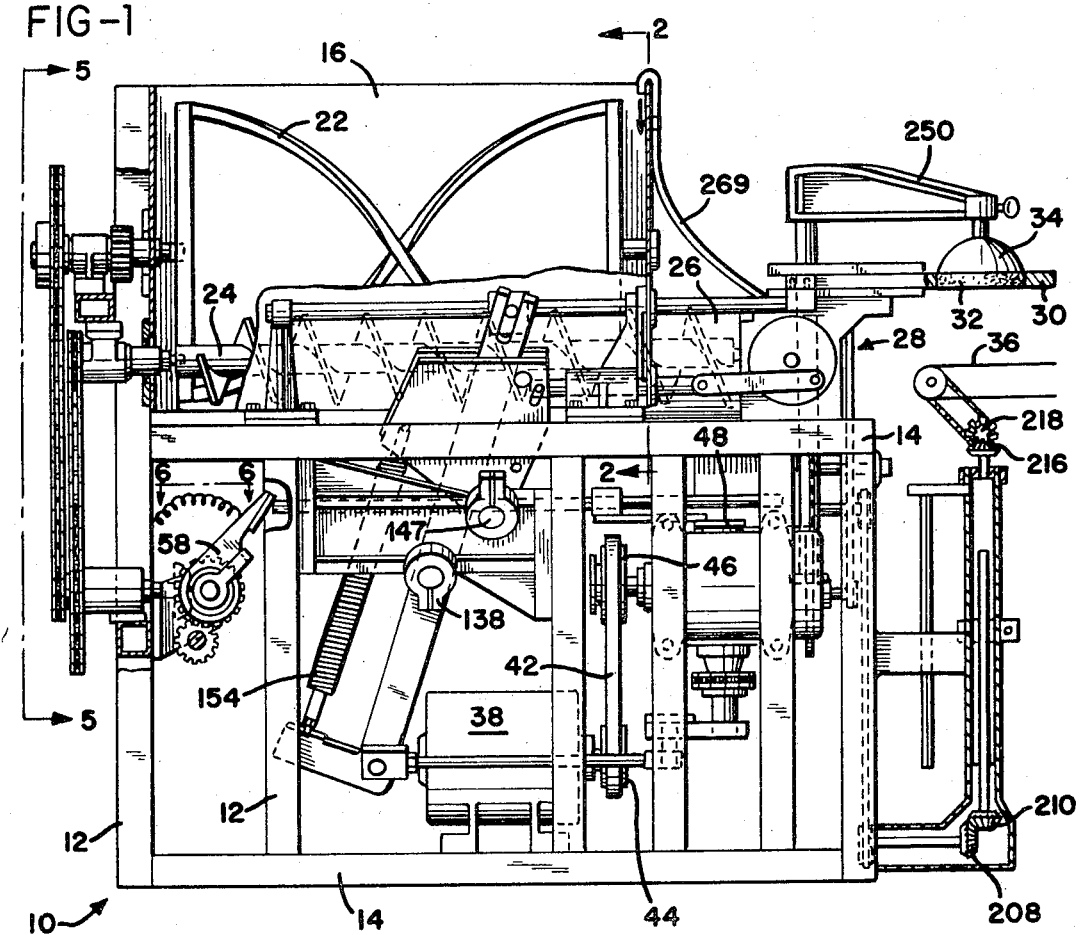
FIG. 1 is a side view with parts in section showing the patty machine of the present invention.
Figure 2:
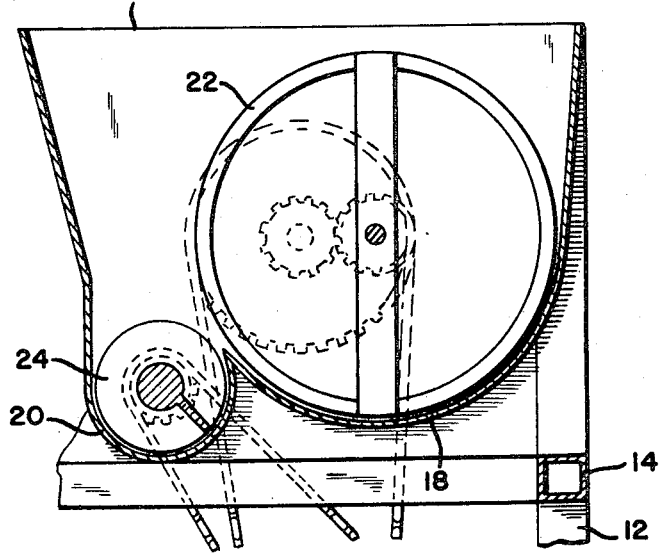
FIG. 2 is a view taken on line 2—2 of FIG. 1.
Figure 4:
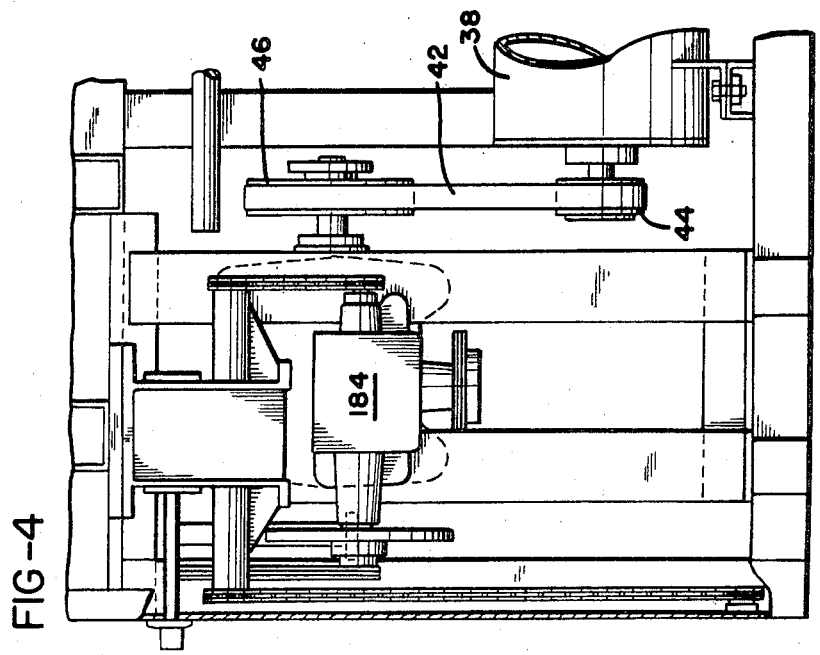
FIG. 4 is another side view of a portion of the machine as seen from the side opposite to that shown in FIG. 1.

With reference initially to FIG. 1 of the drawings, it will be seen that apparatus in accordance with the present invention includes a supporting frame 10 including upright structural members 12 and horizontally extending members 14. Mounted at the top of the framework 10 is a hopper 16 which, as will be noted with reference to FIG. 2, has a contoured lower surface portion 18 and a second lower, contoured portion 20.

A paddle 22 is rotatably mounted in the hopper in closely spaced relation to the contoured portion 18 thereof. A feed screw 24 is also mounted in the bottom of the hopper in closely spaced relationship to the contoured portion 20 thereof and extends outwardly thereof through an exit opening at the forward end of the hopper. A barrel 26 extends from the outlet opening of the hopper 16 to a mold charging piston and cylinder 28.

Slidably mounted above the piston and cylinder 28 is a mold plate 30 having a mold cavity 32 formed therein. A knock-out cup 34 is positioned above the mold plate and, in a manner to be presently described, operates to eject molded patties from the mold cavity 32. A conveyor 36 is positioned beneath the knock-out cup and receives patties ejected from the mold plate by the knock-out cup.

Additional means, not shown, will usually be provided for interleaving sheets of paper between adjacent patties as they are deposited in stacks on the conveyor. Any convenient paper feed device may be utilized such as, for example, that shown in patent application Ser. No. 838,303, filed July 1, 1969, for Separator Sheet Feeder for Food Machinery.

Briefly, and before describing the various components and their interrelations in detail, the operation of the components described above is as follows. A moldable food product is deposited in the hopper 16 and is agitated by intermittent rotation of the paddle 22 to direct the product to the feed screw 24. Feed screw 24, also driven with an intermittent rotation, carries the food product from the hopper to an intake opening of the piston and cylinder 28.

The piston and cylinder 28 then ejects a charge into the cavity 32 when the mold plate has moved to the left as seen in FIG. 1 of the drawings, placing the cavity 32 in communication with the discharge opening of the charging device 28. The mold plate then moves to the right as seen in FIG. 1 permitting the knock-out cup 34 to eject the molded patties from the cavity onto the conveyor 36.

Figure 14:
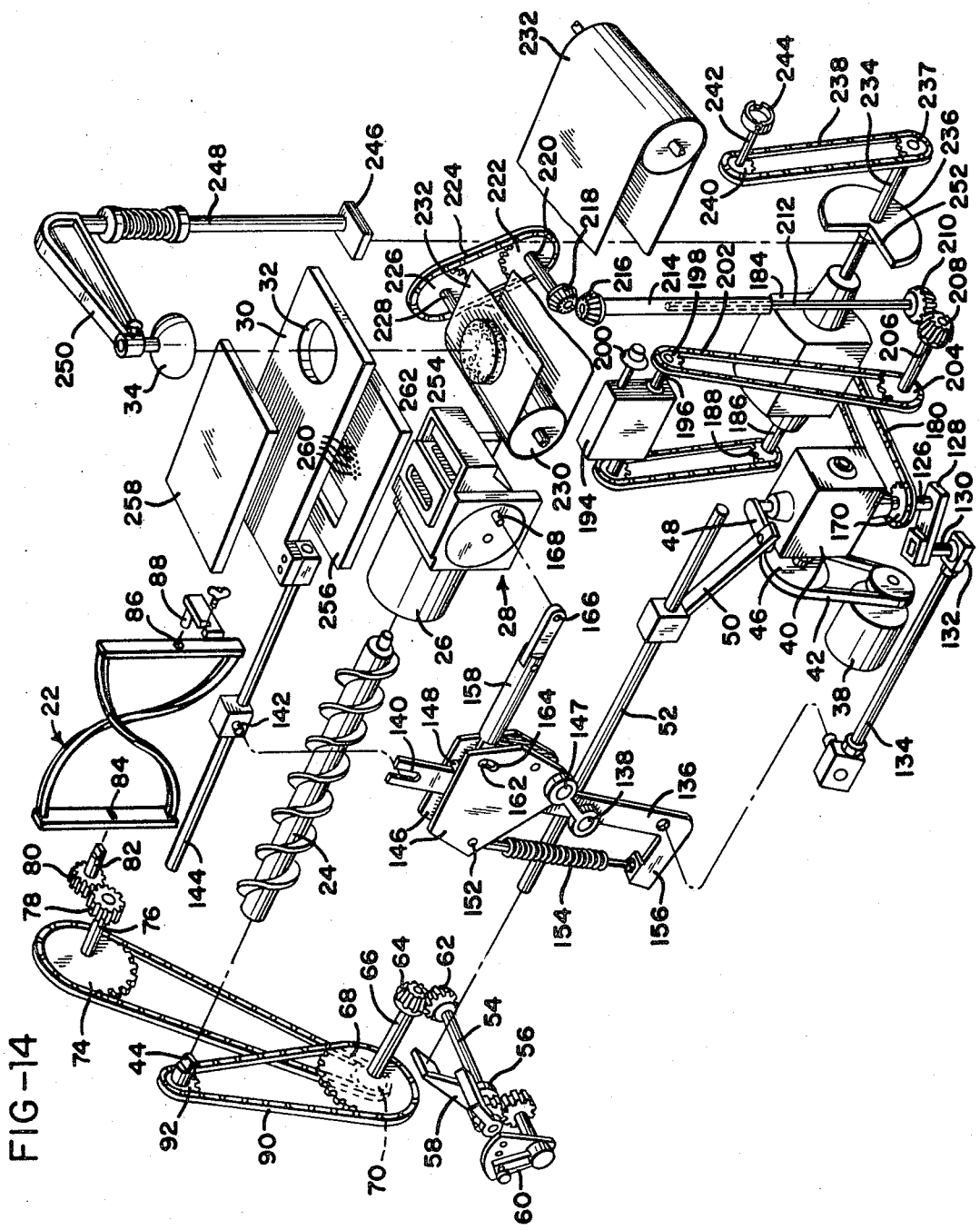
FIG. 14 is an exploded perspective view showing the interrelationship of the drives for the components of the present invention.

Turning now to FIGS. 1, 6 and 14 of the drawings, the drive for the paddle 22 and the feed screw 24 will be described. A motor 38 is mounted within the supporting framework 10 and drives a speed reducer 40 through the endless belt 42 wrapping the sprockets 44 and 46. A first power takeoff from the speed reducer 40 drives a short crane arm 48 which is attached through a connecting link 50 to a push rod 52.

Rotatably mounted at the rear of the machine is a drive shaft 54 and associated with the drive shaft through means of a one-way clutch 56 is a rocker arm 58. A selection device 60 is also associated with the clutch 56 to regulate the magnitude of rotation of the shaft 54 in response to the rocking motion of the rocker arm 58. At its opposite end shaft 54 has affixed thereto a bevel gear 62 mating with a second bevel gear 64 mounted on one end of a shaft 66.

Shaft 66 is also rotatably mounted adjacent the rear of the machine and carries a pair of sprockets 68 and 70 of relatively large and small diameters, respectively.

A chain 72 wraps sprocket 70 and a second somewhat larger sprocket 74 mounted on a shaft 76. Shaft 76 is rotatably mounted at the rear of the hopper 16 and has fixed on its end opposite sprocket 74 a gear 78 mating with a gear 80 carried on one end of a short stub shaft 82.

Shaft 82, at its opposite end, is received in a socket 84 in the end of the paddle 22. The opposite end of the paddle 22 is provided with a substantially circular socket 86 which receives a short, round stub shaft 88 mounted adjacent the front of the hopper. A second chain 90 wraps the sprocket 68 and a smaller sprocket 92 affixed to one end of a stub shaft 94.

The stub shaft 94, similarly to the shaft 82, is received by a socket (not shown) in one end of the screw 24. The opposite end of the screw extends outwardly of the hopper through an exit opening in the forward end thereof. The portion of the feed screw projecting out of the hopper is enclosed in a short barrel 26 interconnecting the hopper 16 and the charging device 28, and, as best seen in FIGS. 9 through 13 of the drawings, a bearing 96 carried by a spider 97 receives the end of the screw to permit rotation thereof.

The piston and cylinder charging device 28 includes, as best seen in FIG. 7 of the drawings, a cylinder portion 98, a piston 100 and a center block 102. Cylinder 98, as may also be noted in FIGS. 9–13 of the drawings, includes a charging opening 104 and a discharge opening 106. The piston 100 has a radially disposed relieved portion 108 formed therein and the piston is mounted within the cylinder for rotation about the longitudinal axis thereof.

The center block 102 has an outwardly projecting portion 110 received in a groove 112 formed in one wall of cylinder. Center block 102 is also provided with a bore 114 which receives the pin 116 extending through openings 118 in the ends of the piston and the bore 114 to fix the center block within the cylinder. The area around the discharge opening 106 also defines a socket 120 to receive a nozzle 122 or 124, FIG. 8 of the drawings.

The speed reducer 40 is provided with a second output shaft 126 which drives a short crank arm 128, the outer end of which is fixed to short shaft 130. The lower end of the shaft 130 is resiliently received in a mounting 132 which allows the shaft 130 to rotate and also allows deflection from the normal centerline of the shaft for a purpose presently to be described.

Attached to the mounting 132 is a connecting rod 134 which is pivotally attached at its opposite end to an L-shaped arm 136. Arm 136 is pivotally mounted on the supporting framework, as at 138, and its upper end is slotted at 140 to receive a short projecting pin 142 mounted on the drive rod 144 of the mold plate 30. A pair of drive plates 146 are also pivotally mounted, as at 147, on the supporting framework 10 and are maintained in spaced apart relationship by a series of spacers 148, 150 and 152.

Spacer 148 also serves as an abutment against which the arm 136 bears during a portion of its travel, while the spacer 152 also serves as an anchor to which one end of the spring 154 is attached, the other end of the spring being fixed to the lower end 156 of the arm 136. A rod 158 having a cross-pin 162 extending through a reduced portion thereof is attached to the plates 146 by means of the arcuate slots 164 formed in the plates and receiving the cross-pin 162.

The opposite end of the rod 158 is provided with an opening 166 which receives a pin 168 projecting from one side of the piston 100. Also mounted on the shaft 126 of the speed reducer 40 is a sprocket 170 about which is trained a chain 180 which also wraps a sprocket 182 extending downwardly from the bottom of gear box 184 (see FIG. 3 of the drawings). A first shaft 186 projects rearwardly from the gear box 184 and carries a shaft 188 at one end thereof.

A chain 190 wraps the sprocket 188 and a second sprocket 192 mounted on a shaft 193 projecting rearwardly from a counter 194. A second shaft 196 projects from the opposite side of the counter 194 and carries a sprocket 198. A handle 200 is also provided for selecting the number of input turns of the shaft 193 necessary to obtain one output turn of the shaft 196. Counters of this general type are well known in the art and the counter per se forms no part of the present invention.

The chain 202 wraps the sprocket 198 and a second sprocket 204 attached at one end to a shaft 206 which carries at its opposite end a bevel gear 208. Bevel gear 208 mates with a second gear 210 mounted on one end of a shaft 212, which is preferably of rectangular cross-section, and the shaft 212 is received in a complementary shaped socket in one end of a shaft 214. The upper end of shaft 214 carries a bevel gear 216 which mates with a second bevel gear 218 fixed to one end of a cross-shaft 220 rotatably mounted near the forward end of the supporting framework 10.

Figure 3:
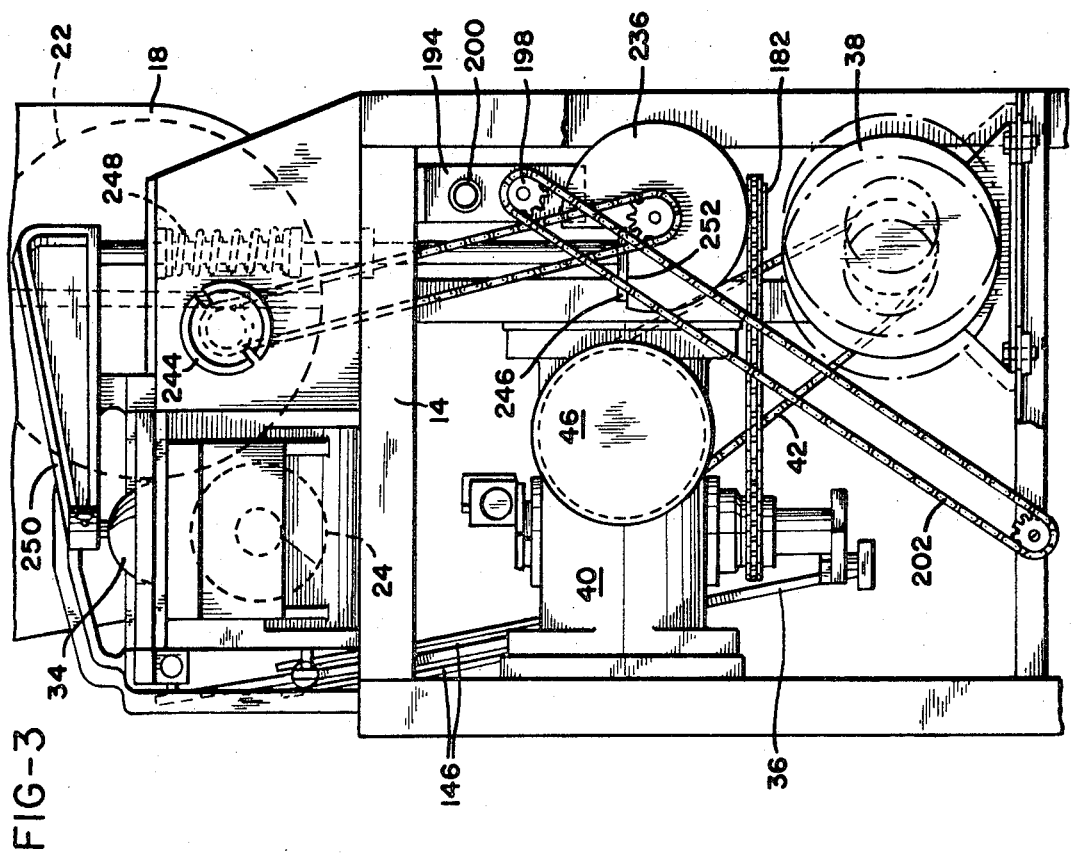
FIG. 3 is an end view of a portion of the apparatus of FIG. 1.

Shaft 220 carries a sprocket 22 about which is trained a chain 224 which also wraps a sprocket 226. Sprocket 226 is connected by means of a shaft 228 to a drive roller 230 of a conveyor belt 232. Projecting forwardly from the gear box 184 is a shaft 234 which has fixed thereto intermediate its ends a cam 236. At its end the shaft 234 carries a sprocket 237 about which is trained a chain 238. Chain 238 is trained about sprocket 240 mounted on the shaft 242 rotatably mounted on the supporting framework. Shaft 242, as best seen in FIGS. 3 and 14 of the drawings, also carries a power takeoff 244 for driving a sheet feed, not shown.

As noted above, in operation the product to be molded into patties, usually a ground meat product, is deposited in the hopper 16, the paddle 22 tends to deposit the product on top of the feed screw 24 with both the paddle 22 and the feed screw being rotated intermittently through the action of the drive and one-way clutch 56 described above. The amount that the feed screw rotates each time it is moved is regulated by means of the control 60 in accordance with the size of the patty being produced so that the correct quantity of the product is delivered to the charging device 28 with each rotational movement of the feed screw.

With reference now to FIGS. 9 through 14 it will be seen that as the connecting rod 134 moves toward the rear of the machine, the upper end of the arm 136 will pivot forwardly, sliding the mold plate 30 to the forwardmost position shown in FIG. 9 of the drawings. As it reaches this forward most position the cam follower 246 on the bottom of the shaft 248 carrying the crosshead 250 for the knock-out cup 34 will reach the cut out portion 252 of the cam, allowing the cup 34 to drop through the mold cavity 32 and eject the molded patty 254 from the cavity.

At the same time the arm 136 has contacted the spacer 148 and pivoted the drive plates 146 about their pivot point 147. This causes the piston 100 to rotate counterclockwise, as seen in FIGS. 9–14, placing the relieved portion 108 thereof in communication with the end of the barrel 26. The charge of the product is positively fed into the piston by means of the feed screw 24. With the arm 136 and the plates 146 at their forwardmost position the resilient mounting 132 deflects through the remainder of the revolution of the crank 128, resulting in a dwell of the mold plate and piston at this position.

As the crank 128 continues to rotate the connecting rod 134 moves forwardly, pivoting the upper end of the arm 136 rearwardly as seen in FIG. 11 of the drawings. Through its spring connection to the plates 146 the arm 136 urges the plates to pivot in a counterclockwise direction about their pivot point 147. However, because a charge of the product is trapped within the piston, the piston will rotate only a small amount as seen in FIGS. 10 and 11.

Continued rearward movement of the upper end of the arm 136 stretches the spring 154, placing the product under pressure. As this pressure increases the mold plate moves rearwardly in the trackway defined by the lower supporting plate 256, and the opposing upper plate 258. As the mold plate reaches the position shown in FIG. 12 of the drawings, a portion of the mold cavity is placed in communication with the discharge opening 106 of the cylinder 98.

The nozzle 122 or 124 directs the flow from the cylinder into the mold cavity. Depending upon the size of the patty being formed it has been found desirable to use different shaped nozzles to orient the meat fibers and prevent the buildup of stresses in the patty during subsequent cooking which may cause distortion and breakage.

As the cavity 32 moves into communication with the cylinder discharge opening 106 the spring 154 presses the food product against the stationary center block 102 forcing the product into the cavity 32. A series of venting openings 260 are formed through the lower support plate 256 so that air which would otherwise be entrapped in the cavity 32 may be ejected from the cavity as it is displaced by the incoming charge of patty material.

Additionally, any of the patty material that has been entrapped in the vent openings 260 will also be ejected into the chamber 262 formed in the cylinder as seen in FIGS. 10 and 11 of the drawings. As the mold plate again moves to its forwardmost position these particles of patty material received in the chamber 262 may be directed into an opening 264 by the action of the center block surface 266 and the opposing surface 268 of the piston. As seen in FIGS. 1 and 10, a conduit 269 may be provided from the opening 264 to direct the patty material back to the hopper 16.

Also it will be noted from FIG. 7 of the drawings that the surface 266 of the center block may be contoured to more efficiently direct the entrapped food particles into the opening 264. Alternately, a cutout portion 270 may be formed in the piston so that as the piston rotates to the position shown in FIG. 9 of the drawings any particles received in the chamber 262 are forced around the end of the stationary center block, as indicated by the arrow in FIG. 11 of the drawings.

As noted above, the output shaft 196 of the counter 194 will make one revolution for a given number of revolutions of the input shaft 193, the ratio being selected by the selector knob 200. In this way, the conveyor drive is regulated to cause the conveyor belt 232 to move one increment after a preselected number of patties have been stacked on the conveyor beneath the knock-out cup 34. Also, as noted above, a paper feed drive can be powered from the takeoff 244, the paper feed per se forming no part of the present invention.

From the above it will be seen that the present invention provides apparatus for producing patties of a moldable food product on a high volume basis and with precise control over the uniformity of the patties produced.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A patty machine comprising:
   a. a cylinder having radially spaced charging and discharging openings,
   b. a piston rotatably received in said cylinder,
   c. means defining a radially disposed relieved portion in said piston,
   d. means for rotating said piston about the longitudinal axis of said cylinder between a first position in which said relieved portion communicates with said charging opening and a second position in which said relieved portion communicates with said discharge opening,
   e. a stationary center block extending from the wall of said cylinder inwardly into said relieved portion of said piston,
   f. a mold plate having portions defining a mold cavity therein,
   g. means for reciprocally moving said mold plate between a first position in which said mold cavity communicates with said discharge opening and a second position in which a molded patty can be removed from said mold cavity, and
   h. means for supplying moldable patty material to said charging means.

2. The machine of claim 1 further comprising:
   a. removable nozzle means mounted in said discharging opening of said cylinder and directing patty material into said mold cavity when said mold plate is in said first position thereof.

3. The machine of claim 1 further comprising:
   a. means for pivotally attaching an inner end of said center block to the center of said piston.

4. The machine of claim 1 wherein:
   a. said relieved portion of said piston extends through approximately half the circumference thereof.

5. The machine of claim 1 further comprising:
   a. a support plate overlying said cylinder and supporting said mold plate during movement thereof,
   b. a second plate extending in spaced parallel relationship to said support plate and defining therewith a trackway for said mold plate, and c. venting means in said supporting plate communicating with said mold cavity when said mold plate is in said first position thereof.
6. The machine of claim 5 further comprising:
a. means communicating with said venting means for receiving patty material expressed therethrough.
7. The machine of claim 6 further comprising:
a. means for recycling patty material expressed through said venting means.
8. The machine of claim 1 further comprising:
a. means defining a socket at said discharge opening,
b. a nozzle received in said socket for directing patty material from said cylinder into said mold cavity.
9. The machine of claim 1 wherein:
a. said piston rotating means is actuated by said mold plate moving means.
10. The machine of claim 9 wherein:
a. said mold plate moving means comprises a pivotally mounted arm,
b. means for pivoting said arm about the pivot point thereof, and
c. a connecting rod attached to said mold plate and said arm for transmitting pivotal movement of said art to said mold plate.
11. The machine of claim 10 wherein:
a. said piston rotating means comprises pivotally mounted plate means and a connecting rod for transmitting pivotal movement of said plate means to said piston, and
b. means for transmitting pivotal movement of said arm to said plate means.
12. The machine of claim 11 wherein:
a. said transmitting means includes a spring interconnecting said arm and said plate means.

* * * * *